United States Patent
Stobbe et al.

(10) Patent No.: US 10,985,582 B2
(45) Date of Patent: Apr. 20, 2021

(54) MODULE MEMORY AND BATTERY DEVICE

(71) Applicant: Intel Corporation, Santa Clara, CA (US)

(72) Inventors: Martin Stobbe, Krailling (DE); Max Von Eicken, Munich (DE)

(73) Assignee: INTEL CORPORATION, Santa Clara, CA (US)

(*) Notice: Subject to any disclaimer, the term of this patent is extended or adjusted under 35 U.S.C. 154(b) by 119 days.

(21) Appl. No.: 16/233,175

(22) Filed: Dec. 27, 2018

(65) Prior Publication Data

US 2019/0157889 A1    May 23, 2019

(51) Int. Cl.
| | |
|---|---|
| *H02J 7/00* | (2006.01) |
| *B64C 39/02* | (2006.01) |
| *G06F 13/14* | (2006.01) |
| *H02J 7/04* | (2006.01) |
| *H01M 10/42* | (2006.01) |

(52) U.S. Cl.
CPC .......... *H02J 7/0045* (2013.01); *B64C 39/024* (2013.01); *G06F 13/14* (2013.01); *H02J 7/04* (2013.01); *B64C 2201/04* (2013.01); *B64C 2201/066* (2013.01); *H01M 10/4257* (2013.01)

(58) Field of Classification Search
CPC ......... H02J 7/0045; H02J 7/04; B64C 39/024; B64C 2201/04; B64C 2201/066; G06F 13/14; H01M 10/4257
See application file for complete search history.

(56) References Cited

U.S. PATENT DOCUMENTS

| | | | |
|---|---|---|---|
| 2007/0035917 A1* | 2/2007 | Hotelling | G06F 1/1632 361/679.56 |
| 2010/0093401 A1* | 4/2010 | Moran | H02J 7/0044 455/566 |
| 2013/0154552 A1* | 6/2013 | Siessegger | H02J 7/0042 320/108 |

* cited by examiner

*Primary Examiner* — Arun C Williams
(74) *Attorney, Agent, or Firm* — Viering, Jentschura & Partner MBB

(57) ABSTRACT

Herein is disclosed a power and data storage module comprising a mechanical interface, configured to mechanically connect the power and data storage module to an robot or a charging device; an electrical interface, configured to electrically connect the power and data storage module to the robot or the charging device; a battery, configured to supply an electrical charge to the robot or to store an electrical charge received from the charging device; a memory, configured to store data received via the electrical interface from the robot or the charging device, and to provide stored data via the electrical interface to the robot or the charging device; and one or more processors, configured to perform one or more battery management functions on the battery and one or more memory management functions on the memory.

17 Claims, 4 Drawing Sheets

MODULE MEMORY AND BATTERY DEVICE

TECHNICAL FIELD

Various aspects of the disclosure relate generally to a modular device for the storing and providing of an electrical charge and the storing and reading of data.

BACKGROUND

Many devices utilize a battery as a primary source of power. Said devices may be configured with a modular or removable battery, such that the battery may be removed from the device and subsequently charged. The use of a modular battery may allow the device to be used until depletion of battery capacity, and then the spent battery may be removed and replaced with a charged battery, such that the device can quickly resume operation. For at least this reason, it is known to use a modular battery in an Unmanned Aerial Vehicle (UAV). In this manner, the UAV may be operated until depletion of the battery, at which time the spent battery may be exchanged for a charged battery, and the operation of the UAV may be quickly resumed.

Some UAVs using such modular batteries are known to gather data throughout their operation and to store said data on a memory. It may be desirable to subsequently transfer the stored data to one or more external processors for subsequent data processing. In order to achieve this, some such UAVs are equipped with a removable memory, such as on a commercial memory card or other standardized data storage medium. In this manner, the removable memory may be removed from the device and inserted into a separate reader, such that the stored data may be read.

SUMMARY

Herein is disclosed a power and data storage module including a mechanical interface, configured to mechanically connect the power and data storage module to a robot or a charging device; an electrical interface, configured to electrically connect the power and data storage module to the robot or the charging device; a battery, configured to supply an electrical charge to the robot or to store an electrical charge received from the charging device; a memory, configured to store data received via the electrical interface from the robot or the charging device, and to provide stored data via the electrical interface to the robot or the charging device; and one or more processors, configured to perform one or more battery management functions on the battery and one or more memory management functions on the memory.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

Figure 1:
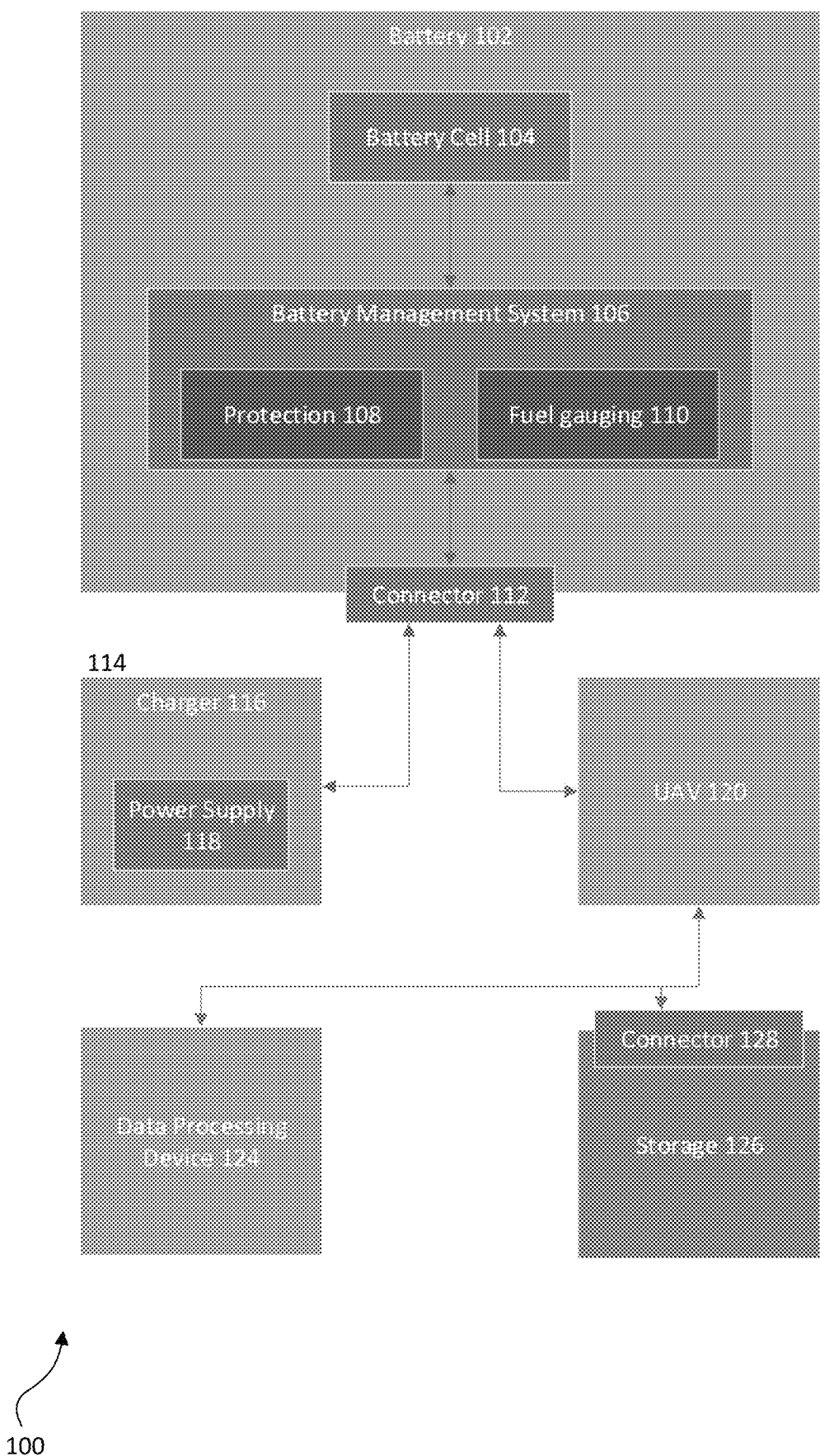
FIG. 1 depicts a known battery management system.

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration." Any aspect of the disclosure described herein as "exemplary" is not necessarily to be construed as preferred or advantageous over other aspects of the disclosure.

Throughout the drawings, it should be noted that like reference numbers are used to depict the same or similar elements, features, and structures.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "robot" may refer to any vehicle that moves autonomously or semi-autonomously. As used herein, "robot" may specifically include, but is not limited to, an unmanned aerial vehicle, a unmanned land vehicle, a drone, a land vehicle, a flying vehicle, a land robot, a flying robot, a water vehicle, or otherwise. In circumstances in which the term "unmanned aerial vehicle" is used herein, said circumstances may also be said to refer to a robot.

During the preparation of a UAV flight, large amounts of data may be generated on external systems. This data may need to be available during the flight for onboard computing tasks and therefore is transferred to and stored on the UAV system. During the flight, a UAV may capture large amounts of data and store said data. In order to make these data available for post-processing on any external system, the data must generally be transferred to a second device.

Herein is disclosed a module device that includes a mass storage medium and a battery. Said battery may be suitable for use with a UAV. It is known to configure UAV batteries with one or more processors, which may perform one or more battery management functions, such as charging, protection, and/or fuel gauging. According to one aspect of the disclosure, a data storage element can be added to a modular battery system, such that the data storage element can be utilized by a device, such as a UAV, during operation, and the stored data can subsequently be read by an outside device. According to an aspect of the disclosure, battery charging and a transfer of stored data from the data storage element can be achieved with a single interface.

It is known to exchange UAV batteries between flights. This often requires physically removing the battery and connecting the battery to a charging device. Moreover, many UAVs gather and store data during the course of a flight, which requires the data to subsequently be transferred to a second device where it is accordingly processed. This is often achieved through a removable memory device, such as an SD Card is removed from the UAV and inserted into an SD card reader on an outside device. Thus, at the completion of a UAV mission, and according to the steps as described above, a battery must be removed and inserted into a battery charger, and a memory module must be separately removed and inserted into a memory reader, according to the known practice.

It is noted that many removable battery modules, such as modules used in UAV flight, include one or more processors, which manage a number of battery functions. The one or more processors may be further configured to manage one or more memory functions, such that the memory could be combined into the removable battery module. A mass storage module can be integrated into the battery, thereby removing the additional efforts required to handle dedicated storage.

In some circumstances, it may be known to transfer stored data from a UAV to an outside device via a wireless transmission. Even where such wireless transmissions are effective, the transfer speed of many mass storage devices is significantly faster than can be achieved on a wireless data transfer. For example, where the memory is a solid-state memory or an SD card memory, the data may be transferred from the memory to an exterior device via one or more galvanic connections at a greater speed than would be possible via a wireless transmission.

By integrating a memory and a battery into the same removable module, it may be possible to achieve lower weight and/or reduced cost. The integration of memory and battery into a single module unit may permit the sharing of resources, such as the sharing of a single set of one or more processors, rather than having separate processors dedicated to the memory and separate processors dedicated to the battery. Sharing such processors may result in reduced cost, which may be desirable. In addition, sharing of the processors may permit reduced weight, which may be of paramount consideration in certain devices, such as a UAV. Moreover, although many UAVs are equipped with one or more wireless transceivers, it is also known for a UAV to operate without transmission or reception capabilities, and thereby lacking a transceiver. By eliminating the need for wireless transmission, additional cost and/or weight may be eliminated. An integrated modular battery and memory, where desired, may support the ability of the UAV to operate without the need for a transceiver. Although, according to other aspect of the disclosure, a transceiver may be desirable for any of a variety of purposes, and nothing should be understood as a suggestion that a transceiver is incompatible with the devices disclosed herein.

During the preparation of the UAV flight, large amounts of data, including but not limited to, highly detailed flight plans, 3D maps identifying static obstacles, etc., may be generated on any kind of data processing device. This device may be connected with the UAV battery through the battery charger or an adapter. Then the data may be transferred to and stored on the battery management system. When the battery is inserted into the UAV, the data may become available for the UAV flight.

In addition, many UAV flights require collection of large amounts of data, such as, but not limited to, high-resolution images, movies, very precise measurements, etc. During the course of the flight, these data may be stored a memory that is part of the memory and battery module. After landing, the battery will typically be recharged. By removing the battery from the UAV for charging, the data can be transferred to a data processing device through the charger/adapter.

According to one aspect of the disclosure, the memory may be an SD card, which is included within the power and data storage module. Some pins or connectors of the battery interface can be dedicated to providing current for a battery recharge, while other pins or connectors of the battery interface may be dedicated to accessing the SD card for data transfer.

According to another aspect of the disclosure, and integrated memory circuit may be placed directly within the power and data storage module. The integrated memory circuit may be any form of integrated circuit whatsoever that is capable of storing data.

The interface may include one or more connectors for connecting the battery to a device and connecting the memory to a device. The electrical connectors may be any type of electrical connectors whatsoever which are capable of charging the battery or providing an electrical current from the battery, and providing data for storage on the memory or transferring stored memory data to the device. The interface connectors may include any number of galvanic connectors, pins, contact pads, or otherwise. The interface connectors may be connectors configured to establish an inductive coupling or a capacitive coupling between the power and data storage module and the device. According to one aspect of the disclosure, the connectors of the interface may be selected to enable a rapid transfer of data between the memory and the device.

FIG. 1 shows a conventional configuration for managing battery charge and stored data 100. A modular battery device 102 is configured as being connectable to a battery-charging device 114 and a UAV 120. The modular battery device 102 generally includes a battery cell 104 and a battery management system 106. The battery cell 104 may be any type of battery cell capable of storing an electric charge. According to one aspect of the disclosure, the battery cell may be, for example, a lithium-ion battery cell or a lithium polymer battery cell. The battery management system 106 may include one or more processors, which are configured to perform battery management functions. Said battery management functions may include, but are not limited to, battery protection 108, such as controlling a current entering or exiting from the battery. Other battery management system 106 functions may include fuel gauging 110, which may include predicting a remaining duration until depletion of the battery, predicting a remaining period until battery charge reaches a predetermined threshold, predicting a remaining charge time, predicting a remaining number of charge cycles, or otherwise. The battery 102 may further include a connecting interface 112, which may be configured to connect the battery 102 to a charging device 114 or a UAV 120. The charging device may include a charger 116 and a power supply 118. The charger 116 may include one or more components to deliver an electric charge from the power supply to the battery 102 through the connecting interface 112. The UAV 120 may be configured to receive the battery 102, and to establish an electrical connection to the battery 102 through the connecting interface 112. The UAV 120 may be configured with a corresponding connector to achieve an electrical connection to the battery 102 through the connecting interface 112.

The UAV 120 may further include a data processing device 124 and a data storage device 126. The data storage device may be configured to be removably connected to the UAV 120 through an electronic interface/connector 128. In this case, the data processing device 124 is known to manage the storing of data on the storage device 126 and/or the reading of data from the storage device 126. In this configuration, and upon completion of a flight by the UAV 120, the storage device 126 may require removal from the UAV 120 and placement into a device for reading or saving of data with respect to the storage device 126. Moreover, the battery 102 may require removal from the UAV 120 and placement within a charging device, such as the charging module 114, such that the battery 102 may be charged for a subsequent flight.

Figure 2:
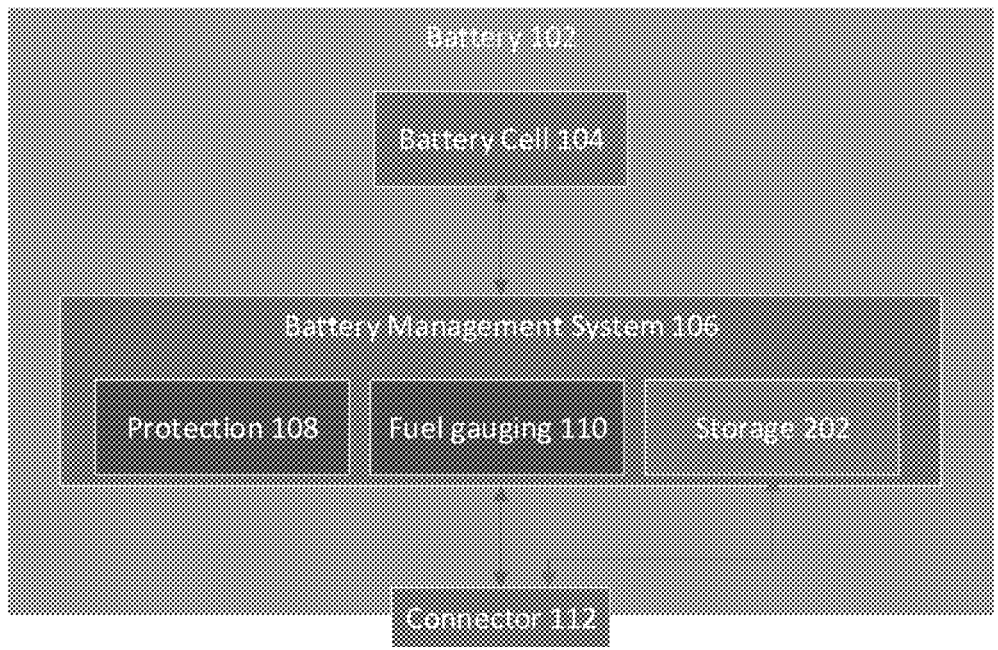
FIG. 2 depicts a battery and memory module according to an aspect of the disclosure.
Figure 2:
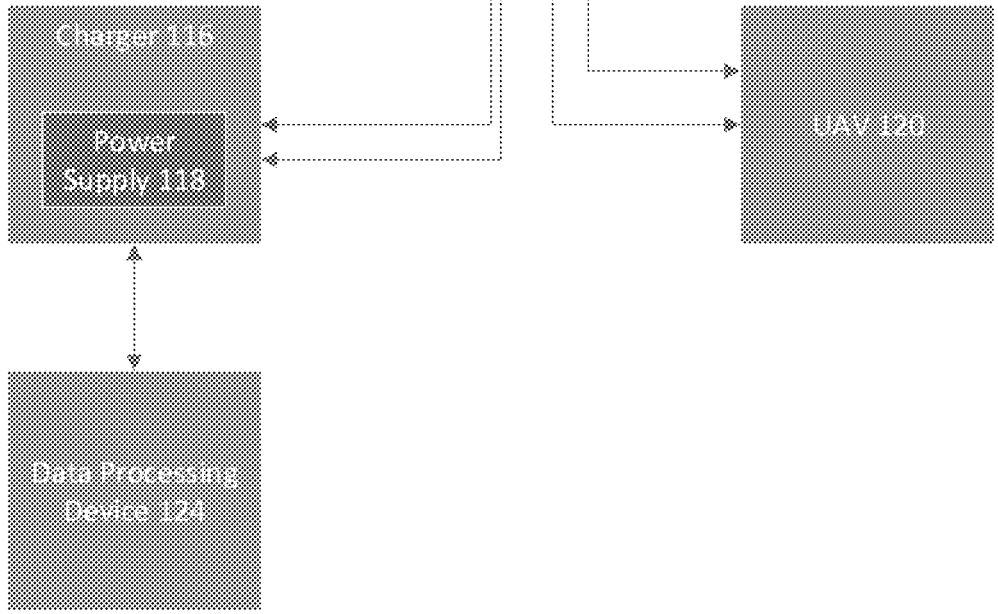

FIG. 2 depicts a power and data storage module 201, according to an aspect of the disclosure. The power and data storage module 201 includes a battery module 102 including a battery cell 104 and a battery management system 106. As compared to the battery management system 106 of FIG. 1, the battery management system 106 of FIG. 2 additionally includes a data storage module 202. As will be described in greater detail, the data storage module 202 may include any known device for storage of data. According to one aspect of the disclosure, the data storage device 202 may include a memory integrated circuit, a solid-state memory, or a removable module memory.

The power and data storage module 201 may further include an electrical connection interface 112 configured to establish an electrical connection to a charging device 114 or UAV 120. The charging module 114 may include a power supply 118 as described above, and a charging mechanism 116 as described above. The charging device 114 may further include a data processing device 124, configured to read stored data from the storage device 202 via the electrical connection interface 112 and/or store data on the storage device 202 via the electrical connection interface 112. The power and data storage module 201 may also be connected to the UAV 120.

The power and data storage module 201 may be configured to connect through a device charger 114 through the connection interface 112. The device charger 114 may include a power supply 118 and one or more charging elements 116, which are configured to provide a charge from the power supply to the power and data storage module 201 via the electrical interface 112. The device charger 114 may further include a data processing device 124, which may be configured to read data from the data storage 202 or to save data to the data storage 202 via the electrical interface 112. The data processing device 124 may include one or more processors, which may be configured to connect with the data storage device 202, write to the data storage device 202, or read from the data storage device 202. The power and data storage module 201 may be also be configured to be alternatively connected to a UAV 120 or a charger via the electrical interface 112.

In this manner, the power and data storage module 201 may be connected to the device charger 114 prior to a UAV flight. While connect to the charger 114, the charger 114 sends an electric charge through the electrical interface 112 to the battery management system 106, which in turn provides the electrical charge to the battery cell 104. In this manner, the battery cell 104 becomes charged. Prior to, during, or following the battery charging, data may be transferred from the data processing device 124 through the battery charger 114 via the electrical interface 112 into the data storage 202. In this manner, data may be written onto the data storage 202 prior to, during, and/or following a battery charge.

When the battery is sufficiently charged, the power and data storage module 201 may be removed from the charging device 114 and may be connected to the UAV 120. By connecting the power and data storage module 201 to the UAV 120, the power and data storage module provides an electric charge to the UAV 124 for the UAV's operation. In addition, any data stored on the storage device 202, including but not limited to data stored on the storage device 202 by the data processing device 124 prior to connection to the UAV 120, becomes available to the UAV 120 during the course of flight. In addition, the UAV may be configured to receive data from a number of sources during flight, such as, but not limited to, data received from one or more image sensors, data received from one or more audio sensors, data received from one or more position sensors, or otherwise. Any data received by the UAV 120, whether image data, positional data, sound data, or otherwise, may be stored on the storage device 202 during the course of flight.

At the conclusion of the flight, the power and data storage module 201 may be removed from the UAV 120 and connected with the charger 114. Upon connecting the power and data storage module 201 with the charger 114, the charger may recharge the battery cell 104. In addition, the charger, using the data processing device 124, may read data from the storage device 202, such as, but not limited to, data stored on the storage device 202 during the course of flight. This may include, for example, and without limitation, data stored on the storage device from one or more image sensors, one or more audio sensors, or one or more positional sensors.

Figure 3:
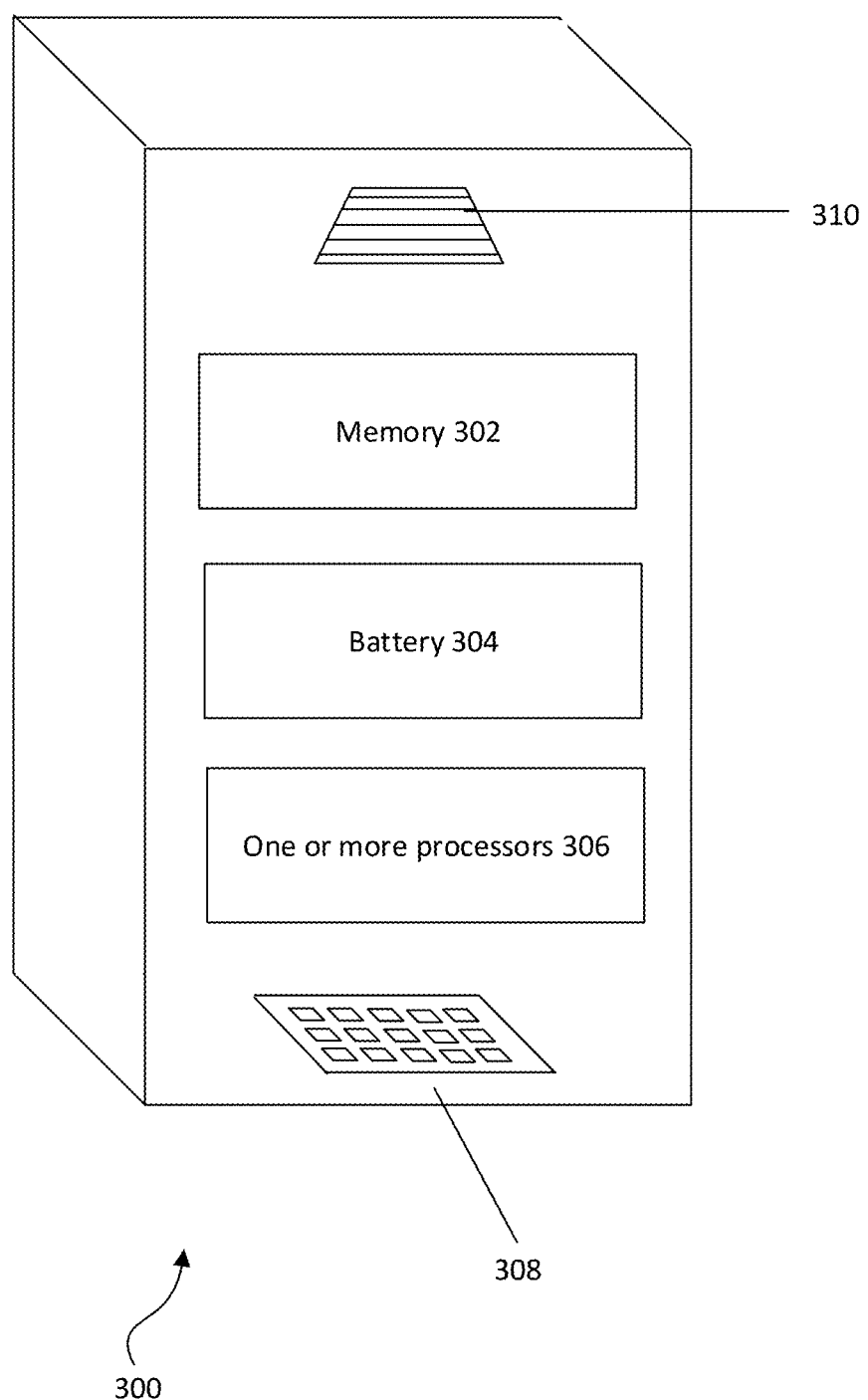
FIG. 3 depicts a configuration of a removable battery and memory module, according to an aspect of the disclosure.

FIG. 3 depicts the power and data storage module according to an aspect of the disclosure 300. The power and data storage module may include a housing in or on which are placed in a memory 302, a battery 304, one or more processors 306, an electrical interface 308, and a mechanical interface 310. The mechanical interface 310 may be configured to mechanically connect the power and data storage module to a UAV or a charging device. The mechanical interface 310 may be any interface capable of establishing a removable mechanical connection between a UAV and a charging device, such that the power and data storage module is connected to one of the UAV or charging device at a time. This mechanical interface may include a mechanical device such as a latch, a friction-based device, if fasteners such as a screw or nut or otherwise, or any other mechanical connection device whatsoever, without limitation. The electrical interface may be configured to electrically connect the power and data storage module to the UAV or the charging device. The electrical interface 308 may be any type of electrical interface that is capable of establishing an electrical connection between the power and data storage module and either the UAV or the charging device. The electrical interface 308 may include a plurality of contact pads, a plurality of pins, or any other electrical connection configuration. The electrical interface 308 may be configured to establish an electrical connection via a capacitive or inductive connection. The battery 304 may be configured to supply an electrical charge to the UAV or to store an electrical charge received from the charging device. The memory 302 may be configured to store data received via the electrical interface from the UAV or the charging device, and to provide stored data via the electrical interface to the UAV or the charging device. The one or more processors 306 may be configured to perform one or more battery management functions on the battery 304 and one or more memory management functions on the memory 302.

Figure 4:
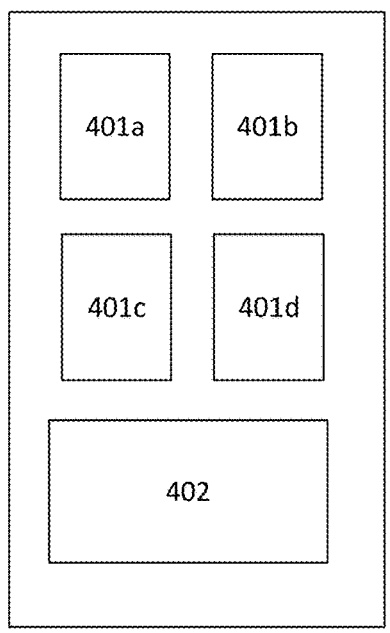
FIG. 4 depicts a first configuration of the memory, according to an aspect of the disclosure.
Figure 5:
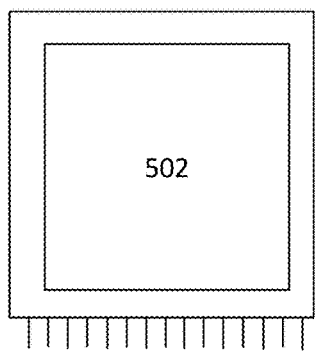
FIG. 5 depicts a second configuration of the memory, according to an aspect of the disclosure.

FIG. 4 depicts a configuration of a data storage or memory according to one aspect of the disclosure. In certain configurations, it may be desirable to utilize a memory integrated circuit for the memory. Such a memory integrated circuit may be housed, for example, on a carrier including one or more processors. In this example, processors 401*a*, 401*b*, 401*c*, and 401*d* are housed on a carrier along with memory 402. The memory 402 may be any type of integrated circuit memory capable of storing data from the UAV and/or battery charging device, and delivering data from the memory 402 to the UAV and/or the battery-charging device. FIG. 5 depicts a memory circuit according to another aspect of the disclosure. According to the figure, the memory circuit may be a solid-state memory or any other memory circuit that is connectable to the one or more processors.

Figure 6:
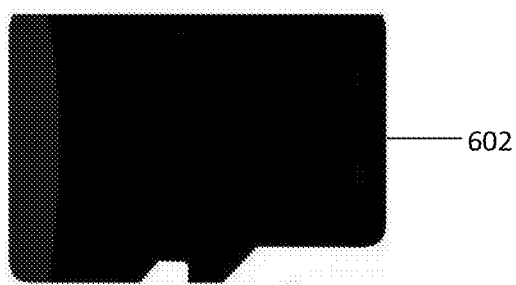
FIG. 6 depicts a third configuration of the memory, according to an aspect of the disclosure.

FIG. 6 depicts a modular memory according to another aspect of the disclosure. In this case, the modular memory 602 may be configured for removable connection with the power and data storage module. In this manner, the power and data storage module may be equipped with a receptacle or other connection interface for the modular memory 602. The modular memory 602 may be placed within the receptacle or connection interface for use by the UAV and the charging device. In this manner, and by allowing the modular memory 602 to remain within the power and data storage module while connected to the UAV and the power charger, it may be possible to read from and/or write to the memory while the power and data storage module is connected to the UAV, and it may similarly be possible to read from and/or write to the memory when the power and data storage module is connected to the charging device. According to one aspect of the disclosure, the modular memory 602 may be configured as a Secure Digital (SD) card. The configuration of SD card may be any configuration, including, but not limited to, a standard SD card, a mini SD card, or a micro SD card. The modular memory 602 is not limited to an SD card format, but rather may be formatted according to any known standard, without limitation.

The one or more processors of the power and data storage module may be configured to perform one or more battery management functions and one or more current management functions. The battery management functions may include at regulating a current to the battery; regulating a current from the battery; determining a remaining battery capacity; determining a period until the stored battery charge reaches a predetermined threshold; or determining duration until battery depletion.

Although it is stated herein that the one or more processors of the power and data storage module may be configured to perform the one or more battery management functions, the battery charger may be equipped with one or more processors, and the one or more processors of the battery charger may be configured to perform any one or more of the above battery management functions. That is, when the power and data storage module is connected to the battery charger, the one or more processors of the battery charger may be configured to control a current to or from the battery, or calculate charging capacity or time as described above.

The one or more processors of the power and data storage module may be configured to perform one or more memory functions. Said memory functions may include writing data onto the memory and/or reading data from the memory. The memory functions may further include deleting the memory, copying the memory, or transferring the memory data to an additional location.

The power data storage module may be electrically connected to the UAV or the battery charger via an electrical interface. The electrical interface may be a bus, whether a serial bus, a parallel bus, or any bus whatsoever. The electrical interface may conform to any known standard including, but not limited to, Universal Serial Bus (USB), USB-3, USB-micro, or otherwise. The electrical interface may include a plurality of pins for connection to the UAV or battery charger. The electrical interface may include a plurality of contacts for connection to the UAV or battery charger.

The battery charger may be configured to perform the functions of at least battery charging, memory writing, and memory reading. The battery charger may include a battery-charging module including one or more processors to perform the battery charging. In this manner, a power source is controlled by the one or more processors, which manage the flow of an electrical charge from the battery charger to the battery of the power and data storage module. Alternatively, the battery charger may include a power source, which transmits a current through the electrical interface to the power and data storage module. In this manner, the current may be regulated by one or more processors within the power and data storage module, rather than one or more processors within the battery charger.

The charging device may be configured to electrically connect with the power and data storage module via the electric interface. The connection of the charging device to the power and data storage module permits both charging of the battery of the power and data storage module and reading from or writing to the memory of the power and data storage module. The battery charging may occur simultaneously with the memory reading or writing. Alternatively, the battery charging may occur prior or subsequently to reading from or writing to the memory.

According to one aspect of the disclosure, the devices described herein may be used for performance of a UAV light show. It is known to perform a light show using a plurality of UAVs, each of the UAVs including a light source and being programmed to project light from one or more predetermined locations. The performance of such UAV light shows typically requires programming each UAV with a plurality of predetermined flight paths. Said pre-programming may require transfer of a significant amount of data to a memory of the UAV. In some configurations, it is known to wirelessly transmit the flight path data; however, the wireless transmission of such data may be slow and produce an undesirable result. Other configurations equip the UAV with a removable memory, such as a removable card or chip, on which the necessary flight information may be stored, and the chip may be subsequently inserted into the UAV. In this configuration, however, charging of the battery and programming of the data into the memory require two separate steps with two separate elements. Improved efficiency may be realized by incorporating both the memory and the battery into a single removable unit. Moreover, because it is known to use one or more processors for battery management within a removable battery module, the same processors may be, if desired for the implementation, utilized for memory management, such as, but not limited to, writing to the memory or reading from the memory.

It is also known to equip a UAV with one or more image sensors for obtaining image data. In many applications, a UAV may be equipped with one or more image sensors and may be programmed to gather images during a period of flight. These images may be locally stored on one or more memories within the UAV.

Very often these images are used for purposes that require significant processing power for subsequent image processing. In this case, the images are typically transferred from the UAV to equipment with greater processing power. Because of the bulk of data gathered during said missions, wireless transmission of the image data may be slow or undesirable. It is known to store the image data on one or more removable memory units, such as a removable card or chip, and to transfer the removable memory unit to a memory reader in another device. This may be done, for example, by equipping the UAV with an SD card, and by transferring the SD card to an outside device. Once again, this requires a separate set of actions for management of the memory and management of the battery. That is, because a battery must be recharged at the conclusion of the UAV flight, the battery must be removed and transferred to a battery charger, and the memory must also be separately removed and transferred to a battery charger. Combining the battery and memory into a single modular unit increases efficiency. Moreover, because the battery often uses one or more processors for battery management, these processors may also be used for memory reading or storage.

The following examples pertain to various aspects of the disclosure as described herein:

In Example 1, a power and data storage module is disclosed including a mechanical interface, configured to mechanically connect the power and data storage module to a UAV or a charging device; an electrical interface, configured to electrically connect the power and data storage module to the UAV or the charging device; a battery, configured to supply an electrical charge to the UAV or to store an electrical charge received from the charging device; a memory, configured to store data received via the electrical interface from the UAV or the charging device, and to provide stored data via the electrical interface to the UAV or the charging device; and one or more processors, configured to perform one or more battery management functions on the battery and one or more memory management functions on the memory.

In Example 2, the power and data storage module of Example 1 is disclosed, wherein the one or more battery management functions include at least one of regulating a current from the battery and regulating a current to the battery.

In Example 3, the power and data storage module of Example 1 or 2 is disclosed, wherein the one or more battery management functions include determining at least one of a remaining battery capacity; a period until a stored battery charge reaches a predetermined threshold; or a remaining duration until battery depletion.

In Example 4, the power and data storage module of any one of Examples 1 to 3 is disclosed, wherein the one or more memory functions include at least one of writing data onto the memory and reading data from the memory.

In Example 5, the power and data storage module of any one of Examples 1 to 4 is disclosed, wherein the electrical interface is a bus.

In Example 6, the power and data storage module of any one of Examples 1 to 5 is disclosed, wherein the electrical interface includes one or more electrical connectors, configured to establish a galvanic connection with one or more corresponding electrical connectors in the UAV or the charging device.

In Example 7, the power and data storage module of any one of Examples 1 to 7 is disclosed, wherein the charging device includes a battery charger, configured to charge the battery of the power and data storage module via the electrical interface.

In Example 8, the power and data storage module of any one of Examples 1 to 7 is disclosed, wherein the charging device includes a memory reader, configured to read the memory of the power and data storage module via the electrical interface.

In Example 9, the power and data storage module of any one of Examples 1 to 8 is disclosed, wherein the charging device includes a memory writer, configured to write to the memory of the power and data storage module via the electrical interface.

In Example 10, the power and data storage module of any one of Examples 1 to 9 is disclosed, wherein the device includes one or more processors configured to perform at least one of charging the battery and/or reading or writing to the memory via the electrical interface.

In Example 11, the power and data storage module of any one of Examples 1 to 10 is disclosed, further including a memory interface, configured to receive a removable memory module.

In Example 12, the power and data storage module of Example 11 is disclosed, wherein the memory is a removable memory module.

In Example 13, the power and data storage module of Example 12 is disclosed, wherein the memory is non-volatile memory.

In Example 14, the power and data storage module of Example 12 is disclosed, wherein the memory is a Secure Digital (SD) card.

In Example 15, the power and data storage module of any one of Examples 1 to 10 is disclosed, wherein the memory is an integrated circuit.

In Example 16, a charging device is disclosed, including a power supply, configured to provide an electrical current to a power and data storage module including a battery and a memory; one or more processors, configured to perform one or more battery management functions for the battery in the power and data storage module and one or more memory management functions for the memory in the power and data storage module; and an electrical interface, configured to electrically connect the power supply and the one or more processors to the power and data storage module.

In Example 17, the charging device of Example 16 is disclosed, wherein the one or more battery management functions include regulating a current to the battery.

In Example 18, the charging device of Example 16 or 17 is disclosed, wherein the one or more battery management functions include determining at least one of a remaining battery capacity; a period until a remaining stored battery charge reaches a predetermined threshold; a period until completion of battery charge, or a remaining duration until battery depletion.

In Example 19, the charging device of any one of Examples 16 to 18 is disclosed, wherein the one or more memory functions include at least one of writing data onto the memory via the electrical interface or reading data from the memory via the electrical interface.

In Example 20, the charging device of any one of Examples 16 to 19 is disclosed, wherein the electrical interface is a bus.

In Example 21, the charging device of any one of Examples 16 to 20 is disclosed, wherein the electrical interface includes one or more electrical connectors, configured to establish a galvanic connection with one or more corresponding electrical connectors in the battery module.

In Example 22, the charging device of any one of Examples 18 to 24 is disclosed, wherein the electrical interface is further configured to electrically connect the memory in the power and data storage module to the one or more processors.

In Example 23, a power and data storage system is disclosed including a power and data storage module, including a mechanical interface, configured to mechanically connect the power and data storage module to a UAV or a charging device; an electrical interface, configured to electrically connect the power and data storage module to the UAV or the charging device; a battery, configured to supply an electrical charge to the UAV or to store an electrical charge received from the charging device; a memory, configured to store data received via the electrical interface from the UAV or the charging device, and to provide stored data via the electrical interface to the UAV or the charging device; and one or more processors, configured to perform one or more battery management functions on the battery and one or more memory management functions on the memory; a charging device, including a power supply, configured to provide an electrical current to the power and data storage module; one or more processors, configured to perform one or more battery management functions for the battery in the power and data storage module and one or more memory management functions for the memory in the power and data storage module; and an electrical interface, configured to electrically connect the power supply and the one or more processors of the charging device to the power and data storage module.

In Example 24, the power and data storage system of Example 23 is disclosed, wherein the one or more battery management functions of the power and data storage module include at least one of regulating a current from the battery and regulating a current to the battery.

In Example 25, the power and data storage system of Example 23 or 24 is disclosed, wherein the one or more battery management functions power and data storage module include determining at least one of a remaining battery capacity; a period until a stored battery charge reaches a predetermined threshold; or a remaining duration until battery depletion.

In Example 26, the power and data storage system of any one of Examples 23 to 25 is disclosed, wherein the one or more memory functions power and data storage module include at least one of writing data onto the memory and reading data from the memory.

In Example 27, the power and data storage system of any one of Examples 23 to 26 is disclosed, wherein the electrical interfaces of the power and data storage module and the charging device are busses.

In Example 28, the power and data storage system of any one of Examples 23 to 27 is disclosed, wherein the electrical interface of the power and data storage module includes one or more electrical connectors, configured to establish a galvanic connection with one or more corresponding electrical connectors in the electrical interface of the charging device.

In Example 29, the power and data storage system of any one of Examples 23 to 28 is disclosed, wherein the charging device includes a battery charger, configured to charge the battery of the power and data storage module via the electrical interface.

In Example 30, the power and data storage system of any one of Examples 23 to 29 is disclosed, wherein the charging device includes a memory reader, configured to read the memory of the power and data storage module via the electrical interface.

In Example 31, the power and data storage system of any one of Examples 23 to 30 is disclosed, wherein the charging device includes a memory writer, configured to write to the memory of the power and data storage module via the electrical interface.

In Example 32, the power and data storage system of any one of Examples 23 to 31 is disclosed, wherein the charging device includes one or more processors configured to perform at least one of charging the battery of the power and data storage module and/or reading from or writing to the memory of the power and data storage module via the electrical interface.

In Example 33, the power and data storage system of any one of Examples 23 to 32 is disclosed, wherein the power and data storage module further includes a memory interface, configured to receive a removable memory module.

In Example 34, the power and data storage system of Example 32 is disclosed, wherein the memory is a removable memory module.

In Example 35, the power and data storage system of Example 32 is disclosed, wherein the memory is non-volatile memory.

In Example 36, the power and data storage system of Example 32 is disclosed, wherein the memory is a Secure Digital (SD) card.

In Example 37, the power and data storage system of any one of Examples 23 to 36 is disclosed, wherein the memory is an integrated circuit.

In Example 38, the power and data storage system of any one of Examples 23 to 37 is disclosed, wherein the one or more battery management functions of the charging device include determining at least one of a remaining battery capacity; a period until a remaining stored battery charge reaches a predetermined threshold; a period until completion of battery charge, or a remaining duration until battery depletion.

In Example 39, the power and data storage system of any one of Examples 23 to 38 is disclosed, wherein the one or more memory functions of the charging device include at least one of writing data onto the memory via the electrical interface or reading data from the memory via the electrical interface.

In Example 40, a means for power and data storage is disclosed including a mechanical connection means, configured to mechanically connect the power and data storage module to a UAV or a charging device; an electrical connection means, configured to electrically connect the power and data storage module to the UAV or the charging device; a power storage means, configured to supply an electrical charge to the UAV or to store an electrical charge received from the charging device; a data storage means, configured to store data received via the electrical interface from the UAV or the charging device, and to provide stored data via the electrical interface to the UAV or the charging device; and one or more processing means, configured to perform one or more battery management functions on the battery and one or more memory management functions on the memory.

In Example 41, the means for power and data storage of Example 40 is disclosed, wherein the one or more power storage means management functions include at least one of regulating a current from the power storage means and regulating a current to the power storage means.

In Example 42, the means for power and data storage of Example 40 or 41 is disclosed, wherein the one or more power storage means management functions include determining at least one of a remaining power storage means capacity; a period until a stored power storage means charge reaches a predetermined threshold; or a remaining duration until power storage means depletion.

In Example 43, the means for power and data storage of any one of Examples 40 to 42 is disclosed, wherein the one or more data storage means functions include at least one of writing data onto the data storage means and reading data from the data storage means.

In Example 44, the means for power and data storage of any one of Examples 40 to 43 is disclosed, wherein the electrical interfacing means is a bus.

In Example 45, the means for power and data storage of any one of Examples 40 to 44 is disclosed, wherein the electrical interfacing means includes one or more electrical connectors, configured to establish a galvanic connection with one or more corresponding electrical connectors in the UAV or the charging device.

In Example 46, the means for power and data storage of any one of Examples 40 to 45 is disclosed, wherein the charging device includes a power storage means charger, configured to charge the power storage means of the means for power and data storage via the electrical interfacing means.

In Example 47, the means for power and data storage of any one of Examples 40 to 46 is disclosed, wherein the charging device includes a data storage means reader, configured to read the data storage means of the means for power and data storage via the electrical interfacing means.

In Example 48, the means for power and data storage of any one of Examples 40 to 47 is disclosed, wherein the charging device includes a data storage means writer, configured to write to the data storage means of the means for power and data storage via the electrical interfacing means.

In Example 49, the means for power and data storage of any one of Examples 40 to 48 is disclosed, wherein the device includes one or more processing means configured to perform at least one of charging the power storage means and/or reading or writing to the data storage means via the electrical interfacing means.

In Example 50, the means for power and data storage of any one of Examples 40 to 49 is disclosed, further including a data storage means interface, configured to receive a removable data storage means module.

In Example 51, the means for power and data storage of Example 50 is disclosed, wherein the data storage means is a removable data storage means module.

In Example 52, the means for power and data storage of Example 51 is disclosed, wherein the data storage means is non-volatile data storage means.

In Example 53, the means for power and data storage of Example 51 is disclosed, wherein the data storage means is a Secure Digital (SD) card.

In Example 54, the means for power and data storage of any one of Examples 40 to 50 is disclosed, wherein the data storage means is an integrated circuit.

In Example 55, a power and data storage module is disclosed, including a mechanical interface, configured to mechanically connect the power and data storage module to a UAV or a charging device; an electrical interface, configured to electrically connect the power and data storage module to the UAV or the charging device; a battery, configured to supply an electrical charge to the UAV or to store an electrical charge received from the charging device; a memory, configured to store data received via the electrical interface from the UAV or the charging device, and to provide stored data via the electrical interface to the UAV or the charging device.

In Example 56, the power and data storage module of Example 55 is disclosed, wherein the power and data storage module is configured to connect to one or more processors in the UAV or the or the charging device for performance of one or more battery management functions on the battery and one or more memory management functions on the memory.

In Example 57, the power and data storage module of Example 55 or Example 56 is disclosed, further including one or more processors, configured to perform one or more battery management functions on the battery and one or more memory management functions on the memory.

In Example 58, the power and data storage module of any one of Examples 55 to 57 is disclosed, wherein the one or more battery management functions include at least one of regulating a current from the battery; regulating a current to the battery; determining a remaining battery capacity; determining a period until a stored battery charge reaches a predetermined threshold; or determining a remaining duration until battery depletion.

In Example 59, the power and data storage module of any one of Examples 55 to 57 is disclosed, wherein the one or more memory functions include at least one of writing data onto the memory and reading data from the memory.

In Example 60, the power and data storage module of any one of Example 55 to 59 is disclosed, wherein the charging device includes a battery charger, configured to charge the battery of the power and data storage module via the electrical interface, and wherein the charging device further includes one or more processors configured to read from and write to the memory of the power and data storage module via the electrical interface.

In Example 61, the power and data storage module of any one of Examples 55 to 60 is disclosed, further including a memory interface, configured to receive a removable memory module.

In Example 62, the power and data storage module of Example 61 is disclosed, wherein the memory is a Secure Digital (SD) card.

In Example 63, the power and data storage module of any one of Examples 55 to 62 is disclosed, wherein the memory is an integrated circuit.

In Example 64, a charging device is disclosed, including: a power supply, configured to provide an electrical current to a power and data storage module including a battery and a memory;
one or more processors, configured to perform at least one of a battery management function for the battery in the power and data storage module and a memory management function for the memory in the power and data storage module; and
an electrical interface, configured to electrically connect the power supply and the one or more processors to the power and data storage module.

In Example 65, the charging device of Example 64 is disclosed, wherein the one or more battery management functions include regulating a current to the battery.

In Example 66, the charging device of Example 64 or 65 is disclosed, wherein the one or more memory functions include at least one of writing data onto the memory via the electrical interface or reading data from the memory via the electrical interface.

In Example 67, a power and data storage system is disclosed including a power and data storage module, including a mechanical interface, configured to mechanically connect the power and data storage module to a UAV or a charging device; an electrical interface, configured to electrically connect the power and data storage module to the UAV or the charging device; a battery, configured to supply an electrical charge to the UAV or to store an electrical charge received from the charging device; a memory, configured to store data received via the electrical interface from the UAV or the charging device, and to provide stored data via the electrical interface to the UAV or the charging device; and a charging device, including a power supply, configured to provide an electrical current to the power and data storage module; one or more processors, configured to perform at least one of a battery management function for the battery in the power and data storage module and a memory management function for the memory in the power and data storage module; and an electrical interface, configured to electrically connect the power supply and the one or more processors of the charging device to the power and data storage module.

In Example 681, the power and data storage system of Example 67 is disclosed, wherein the power and data storage module further includes one or more processors, configured to perform one or more battery management functions on the battery and one or more memory management functions on the memory.

In Example 69, the power and data storage system of Example 67 or 68 is disclosed, wherein the one or more battery management functions of the power and data storage module include at least one of regulating a current from the battery and regulating a current to the battery.

In Example 70, the power and data storage system of any one of Examples 67 to 69 is disclosed, wherein the one or more battery management functions of the power and data storage module include determining at least one of a remaining battery capacity; a period until a stored battery charge reaches a predetermined threshold; or a remaining duration until battery depletion.

In Example 71, the power and data storage system of any one of Examples 67 to 70 is disclosed, wherein the one or more memory functions of the power and data storage module include at least one of writing data onto the memory and reading data from the memory.

In Example 72, the power and data storage system of any one of Examples 67 to 71 is disclosed, wherein the charging device includes a battery charger, configured to charge the battery of the power and data storage module via the electrical interface.

In Example 73, the power and data storage system of any one of Examples 67 to 72 is disclosed, wherein the charging device includes a memory reader, configured to read the memory of the power and data storage module via the electrical interface.

In Example 74, the power and data storage system of any one of Examples 67 to 73 is disclosed, wherein the power and data storage module further includes a memory interface, configured to receive a removable memory module.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

The invention claimed is:

1. A power and data storage module comprising:
a mechanical interface, configured to establish a removable mechanical connection between the power and data storage module and a robot and configured to establish a removable mechanical connection between the power and data storage module and a charging device;
an electrical interface, configured to establish a removable electrical connection between the power and data storage module and the robot and configured to establish a removable electrical connection between the power and data storage module and the charging device;
a battery, configured to supply an electrical charge to the robot and to store an electrical charge received from the charging device; and
a memory, configured to store data received via the electrical interface from the robot and the charging device, and to provide stored data via the electrical interface to the robot and the charging device.

2. The power and data storage module of claim 1, wherein the power and data storage module is configured to connect to one or more processors in the robot and the charging device for performance of one or more battery management functions on the battery and one or more memory management functions on the memory.

3. The power and data storage module of claim 1, further comprising one or more processors, configured to perform one or more battery management functions on the battery and one or more memory management functions on the memory.

4. The power and data storage module of claim 3, wherein the one or more battery management functions comprise at least one of regulating a current from the battery; regulating a current to the battery; determining a remaining battery capacity; determining a period until a stored battery charge reaches a predetermined threshold; or determining a remaining duration until battery depletion.

5. The power and data storage module of claim 3, wherein the one or more memory functions comprise at least one of writing data onto the memory and reading data from the memory.

6. The power and data storage module of claim 1, wherein the charging device comprises a battery charger, configured to charge the battery of the power and data storage module via the electrical interface, and wherein the charging device further comprises one or more processors configured to read from and write to the memory of the power and data storage module via the electrical interface.

7. The power and data storage module of claim 1, further comprising a memory interface, configured to receive a removable memory module.

8. The power and data storage module of claim 7, wherein the memory is a Secure Digital (SD) card.

9. The power and data storage module of claim 1, wherein the memory is an integrated circuit.

10. A power and data storage system comprising: a power and data storage module, comprising:
a mechanical interface, configured to establish a removable mechanical connection between the power and data storage module and a robot and configured to establish a removable mechanical connection between the power and data storage module and a charging device;
an electrical interface, configured to establish a removable electrical connection between the power and data storage module and the robot and configured to establish a removable electrical connection between the power and data storage module and the charging device;
a battery, configured to supply an electrical charge to the robot and to store an electrical charge received from the charging device; and
a memory, configured to store data received via the electrical interface from the robot and the charging device, and to provide stored data via the electrical interface to the robot and the charging device; and the charging device, comprising
a power supply, configured to provide an electrical current to the power and data storage module; and
an electrical interface, configured to electrically connect the power supply and the one or more processors of the charging device to the power and data storage module.

11. The power and data storage system of claim 10, wherein the power and data storage module further comprises one or more processors, configured to perform one or more battery management functions on the battery and one or more memory management functions on the memory.

12. The power and data storage system of claim 10, wherein the one or more battery management functions of the power and data storage module comprise at least one of regulating a current from the battery and regulating a current to the battery.

13. The power and data storage system of claim 10, wherein the one or more battery management functions of the power and data storage module comprise determining at least one of a remaining battery capacity; a period until a stored battery charge reaches a predetermined threshold; or a remaining duration until battery depletion.

14. The power and data storage system of claim 10, wherein the one or more memory functions of the power and data storage module comprise at least one of writing data onto the memory and reading data from the memory.

15. The power and data storage system of claim 10, wherein the charging device comprises a battery charger, configured to charge the battery of the power and data storage module via the electrical interface.

16. The power and data storage system of claim 10, wherein the charging device comprises a memory reader, configured to read the memory of the power and data storage module via the electrical interface.

17. The power and data storage system of claim 10, wherein the power and data storage module further comprises a memory interface, configured to receive a removable memory module.

* * * * *